(No Model.)
A. LINDGREN.
YIELDING CULTIVATOR SHOVEL.
No. 428,010. Patented May 13, 1890.
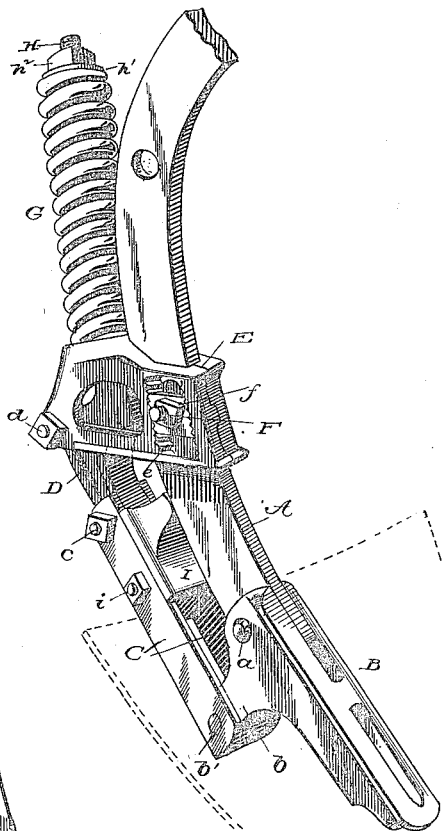
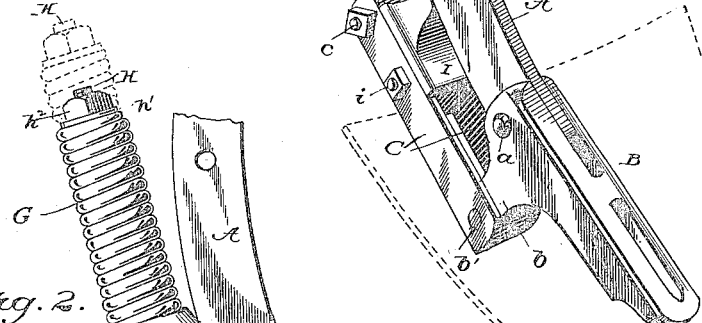
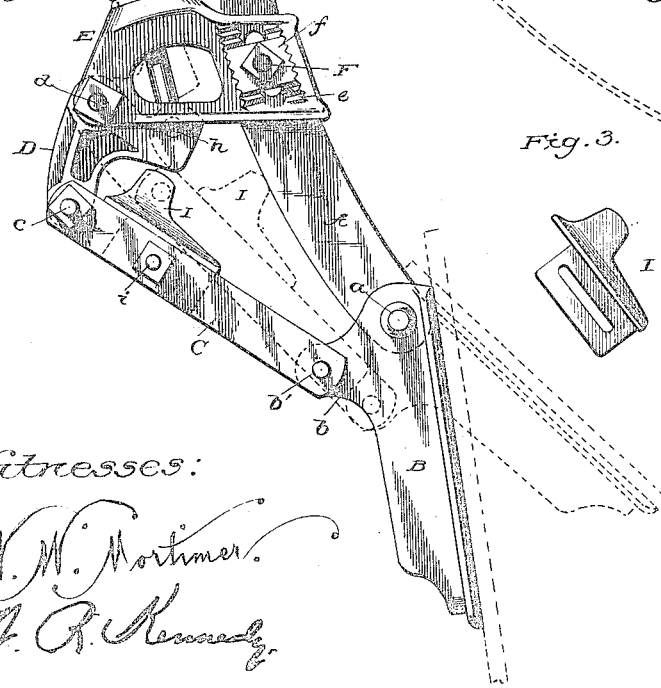
Witnesses:
N. W. Mortimer.
N. R. Kennedy.
Inventor:
August Lindgren
By his atty
Phil. T. Dodge

UNITED STATES PATENT OFFICE.

AUGUST LINDGREN, OF MOLINE, ILLINOIS, ASSIGNOR TO THE MOLINE PLOW COMPANY, OF ILLINOIS.

YIELDING CULTIVATOR-SHOVEL.

SPECIFICATION forming part of Letters Patent No. 428,010, dated May 13, 1890.

Application filed February 14, 1890. Serial No. 340,455. (No model.)

*To all whom it may concern:*

Be it known that I, AUGUST LINDGREN, of Moline, in the county of Rock Island and State of Illinois, have invented certain Improvements in Yielding Cultivator-Shovels, of which the following is a specification.

This invention relates to that class of devices in which the shovel-carrying arm or shank is pivoted to the beam and combined with a spring mechanism in such manner as to permit the shovel to yield or tip backward when it encounters an excessive resistance.

The invention consists in the peculiar arrangement and construction of parts hereinafter described, and particularly in an adjustable stop by which the shovel may be caused to stand in different positions and to withstand more or less strain.

In the accompanying drawings, Figure 1 is a perspective view of my device in operative position, a shovel being shown in dotted lines. Fig. 2 is a side view of the device, showing the position which the parts assume when the shovel yields, and also showing in dotted lines the operative position. Fig. 3 is a side view of the adjustable stop-block.

Referring to the drawings, A represents the downwardly-curved rear end of an ordinary iron cultivator-beam; B, a shovel-carrying block cast complete in one piece, with a slot in its top to receive the lower end of the beam, to which it is connected by the horizontal pivot $a$. The shovel-block is formed with a rearwardly-extending arm $b$ near its upper end and in rear of the pivot. This arm is seated between and connected by a horizontal pivot $b'$ to the lower ends of two upwardly-extending links or straps C C. At their upper ends these straps are connected by a horizontal pivot $c$ to the lower end of an elbow-lever D, which is inserted between them. This lever is mounted near its middle on a horizontal pivot $d$, which is in turn seated at its ends in two complementary plates E, which are applied to opposite sides of the beam and secured rigidly thereto by a through-bolt F, having washers $f$ on its ends. The plates E are adapted to receive the elbow-lever between them, and above the lever they are brought together in such manner as to form a support for the lower end of a helical spring G. A rod H, having its lower end connected by a pin $h$ to the elbow-lever, is extended upward between the plates E and through the spring, its upper end being provided with a washer $h'$ and a nut $h^2$, by which the tension of the spring may be varied.

A stop-block I, slotted longitudinally, as shown in Fig. 3, is inserted between the links C and is secured firmly but adjustably in place by a bolt $i$, passing through the links and through the slot in the stop. The rod being urged constantly upward, tends to hold the elbow-lever in the position shown in Fig. 1 and in dotted lines in Fig. 2, the lower end of the lever acting in turn through the links to hold the block $b$ and the shovel thereon in operative position. The links C and the lower arm of the lever constitute in effect a toggle-joint. The stop-block I, bearing against the rear edge of the beam, holds the links in such position that the three pivots $b$, $c$, and $d$ stand slightly out of line. When, therefore, the resistance of the point of the shovel exceeds the predetermined limit of safety, the spring yields and permits the toggle to assume the position shown in full lines in Fig. 2, thus permitting the shovel-block to tip backward around its pivot $a$.

By adjusting the stop-block I downward between the links it may be caused to hold the toggle "off the center" to a greater or less extent, thus lessening the force necessary to tip the shovel backward. It is necessary in operating in different soils and under different conditions to arrange the shovel at different angles in relation to the perpendicular. In order to permit this adjustment, I provide for adjusting the blocks E upward and downward on the beam, whereby the toggle-connections are caused to change the normal position of the shovel-block. To this end I form the plates E with vertical slots having beveled serrated walls $e$, adapted to engage the serrated edges of the washers $f$, which are drawn tightly to their places therein by a through-bolt fitted closely to a hole in the beam. The bolt prevents vertical play of the washers, and the latter in turn hold the plates E. By slackening the bolt so as to permit the unlockin of the washers from the plates E the latter are permitted to move upward or downward.

Having thus described my invention, what I claim is—

1. In combination with the beam, the shovel-block pivoted thereto, the links, the elbow-lever and the spring-connection for operating the lever, and the lever-supporting blocks E, provided with the slots and serrations, the serrated washers, and the through-bolt holding said washers, whereby the pitch of the shovel may be varied and the parts held firmly at the required adjustment.

2. The standard, the shovel-block pivoted to the standard and having a rearward projection, the spring-actuated lever mounted on a bearing on the rear edge of the standard, the links connecting the lever and shovel-block, and the stop-block carried by the links and abutting against the rear edge of the standard, said members combined and arranged substantially as shown, whereby the links and lever are protected by the standard and adapted to yield in a backward direction that they may not be rendered inoperative by the accumulation of rubbish thereon.

3. In combination with the beam, the shovel-block pivoted thereto, and the plates E, fixed thereto, the angular lever sustained by the plates E, its actuating-spring, the two links connecting the lever with the shovel-block, the slotted stop-block seated between the links, and the through-bolt holding said stop-block adjustably in position.

In testimony whereof I hereunto set my hand, this 30th day of January, 1890, in the presence of two attesting witnesses.

AUGUST LINDGREN.

Witnesses:
J. W. EKLUND,
L. CARY.